Dec. 1, 1931.  H. E. S. HOLT  1,834,840
APPARATUS FOR LOWERING MAIL BAGS AND OTHER LOADS FROM AIRCRAFT
Filed March 13, 1930    2 Sheets-Sheet 1
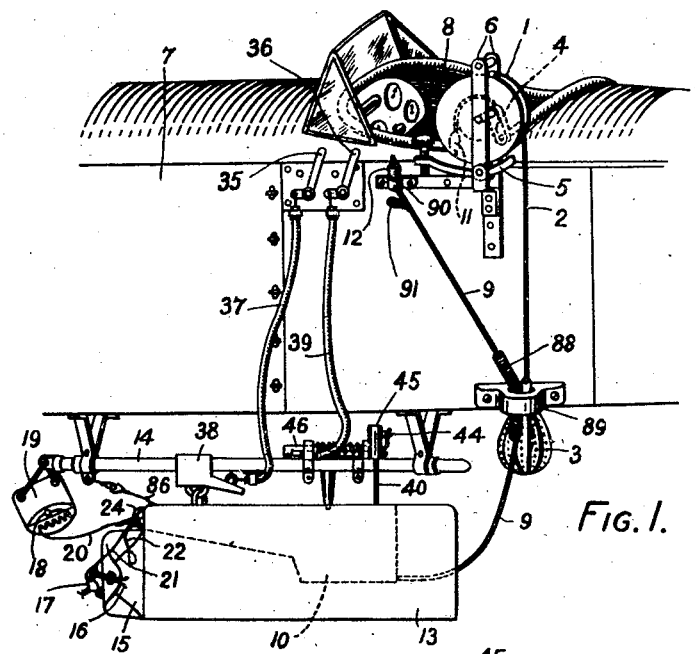
FIG. 1.
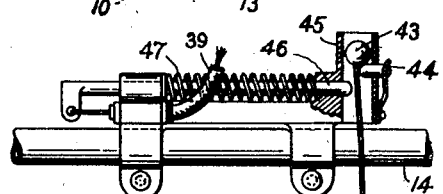
FIG. 2.
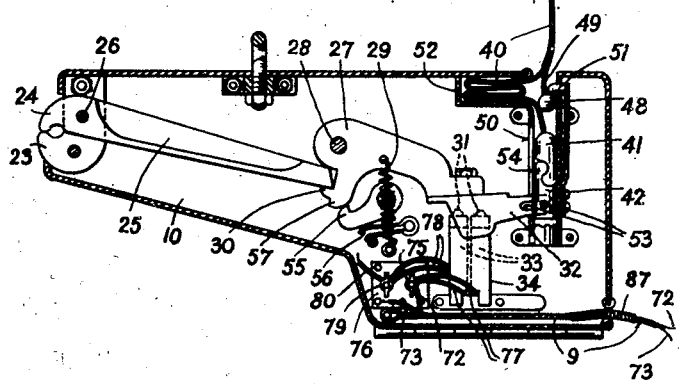
Inventor
H. E. S. Holt,
By Watson E. Coleman
Attorney Dec. 1, 1931.  H. E. S. HOLT  1,834,840
APPARATUS FOR LOWERING MAIL BAGS AND OTHER LOADS FROM AIRCRAFT
Filed March 13, 1930   2 Sheets-Sheet 2

Inventor
H. E. S. Holt,
By Watson E. Coleman
Attorney

Patented Dec. 1, 1931

1,834,840

UNITED STATES PATENT OFFICE

HAROLD EDWARD SHERWIN HOLT, OF LONDON, ENGLAND

APPARATUS FOR LOWERING MAIL BAGS AND OTHER LOADS FROM AIRCRAFT

Application filed March 13, 1930, Serial No. 435,556, and in Great Britain March 23, 1929.

This invention relates to apparatus for lowering mail bags and other loads from air-craft in which the rate of descent of the load is controlled by main and pilot parachutes, means being provided under the control of a pilot weight lowered from a rotary drum or reel whereby the main parachute can be kept inoperative until it reaches approximately a given distance from the ground which is determined by the length of a rope, line or cable formed with separate insulated electric conductors to which the pilot weight is attached, the pilot weight itself being provided with circuit closing means adapted to be operated by impact with the ground or with an object on the ground.

According to the present invention the rotary drum carrying the line with its attached pilot weight is mounted or carried on the aircraft instead of on the parachute controlled load lowering apparatus and means are provided for electrically and mechanically coupling the line to the launching apparatus after the lowering of the pilot weight and the complete unwinding of the line from the drum. By this means the weight and line can be fully run out before the load lowering apparatus proper is launched and many advantages are obtained, for example the load lowering apparatus being no longer encumbered with the drum and its adjuncts can be made much lighter than heretofore, the rate of unwinding of the line is expedited and a longer line or cable can be employed without increasing the size of the load lowering apparatus. Means are also provided for releasing the main parachute and bringing it into operation independently of the action of the pilot weight when the aircraft is flying low, as during foggy weather for example. The pilot weight itself is so constructed with two sets of contact strips that the closing of the circuit is ensured under all conditions of impact.

One way in which the invention may be carried into effect is illustrated by way of example in the accompanying drawings, wherein:—

Figure 3:
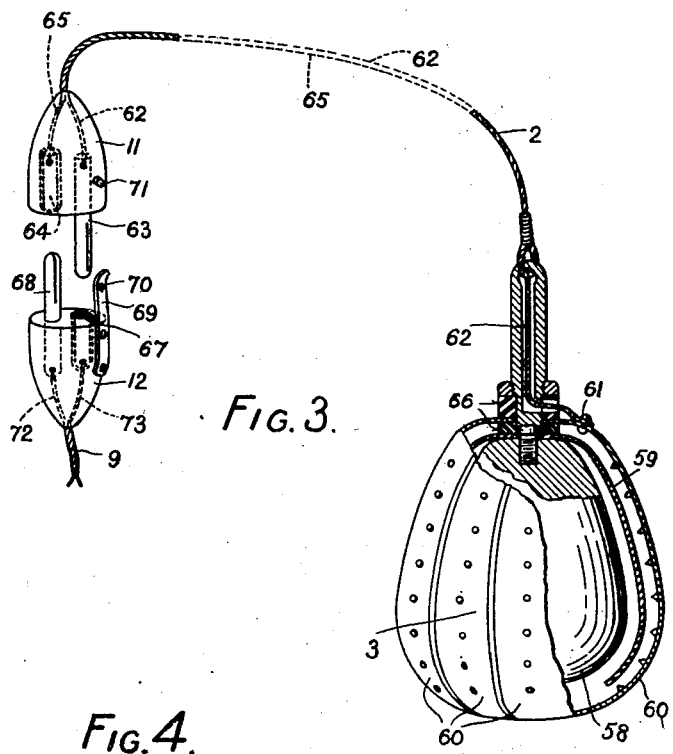
Figure 4:
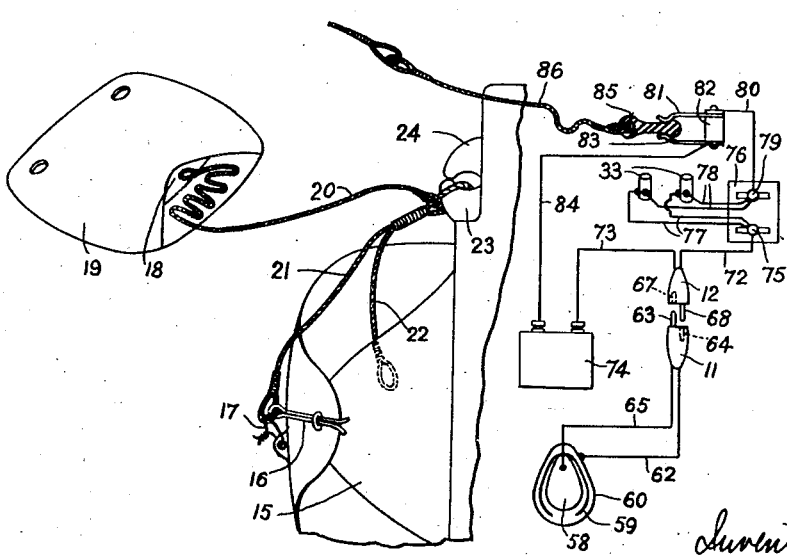

Fig. 1 is a side elevation of a portion of an aircraft fuselage showing the apparatus according to the invention in position thereon, Fig. 2 is a vertical longitudinal section, drawn to a larger scale, of a portion of the apparatus disposed in the load to be lowered, part of the release gear arranged on the aircraft being shown partly in elevation and partly in section, Fig. 3 is a view, on a larger scale, of the weight and its coupling means, partly in section, and Fig. 4 is a fragmentary side elevation of part of the load to be lowered, showing in a diagrammatic manner the electrical circuit employed for releasing the main parachute.

As shown in Fig. 1, the drum 1, carrying the line 2 with its attached pilot weight 3, is provided with suitable controlling means, such as a crank handle 4 and a friction brake 5, and is mounted on a suitable supporting bracket 6 on the aircraft framing 7 in a convenient position adjacent the cockpit 8 so that when the line 2 is fully run out it can be uncoupled from the drum 1 and coupled to a length of cable 9 forming part of the electric controlling circuit to be hereinafter more fully described with reference to Fig. 4. The cable 9 is secured to the load lowering apparatus, indicated generally by 10, and the coupling of said cable with the line 2 is adapted to be effected by means of plug-and-socket connectors 11 and 12 previous to the launching of the apparatus 10 with its load 13 from a launching cradle or beam 14 suspended under the aircraft.

When the load lowering apparatus is launched from high altitudes for example, the main parachute is retained in folded condition in its container 15 in the usual manner by means of flaps held closed by a withdrawable pin 16 and a breaking cord 17 and said parachute is not withdrawn or allowed to operate until the pilot weight 3 reaches the ground. At the time of launching the apparatus however, the pilot parachute 18 is pulled out of a container 19 secured to the cradle or beam 14 on the aircraft and becomes operative, this pilot parachute being connected by a line 20 to the frame of the load lowering apparatus 10 through a releasable coupling and then by lines 21 and 22 with the retaining means 16, 17 for the main parachute and the main parachute itself, respectively. The releasable coupling referred to, as shown more clearly in Fig. 2, consists of a pair of opposed jaws 23 and 24, the jaw 23 being fixed and the jaw 24 formed on a lever 25 pivoted at 26 on the frame of the load lowering apparatus 10, between which jaws is retained an eye or loop on the lines or cables 21 and 22 to which the line or cable 20 from the pilot parachute is connected. The lever 25 is held in the coupling position, against the action of its beam arm, by a catch lever 27 which is pivoted at 28 in the frame and urged by a spring 29 to bring a shoulder 30 thereon beneath the end of the said beam arm of the lever 25. If the coupling be released by movement of the jaw 24 the pull of the pilot parachute acting through the line or cable 20 (Fig. 1) will be transferred to the lines or cables 21 and 22 thus withdrawing the retaining pin 16, after breaking the cord 17, and pulling the main parachute out of its housing 15 for it to become operative. One way of releasing the coupling as aforesaid, for use when the load lowering apparatus has been launched from a high altitude, is to move the shoulder 30 of the catch lever 27 out of engagement with the beam arm of the coupling lever 25, which it holds, by means of the impact of small projectiles 31 (Fig. 2) driven against the under surface of an extension 32 on said catch lever 27 by the electric ignition of explosive charges contained in cartridges 33 carried in a small tube 34 arranged beneath the said extension.

In connection with the launching of the parachute-controlled load lowering apparatus two hand levers 35 and 36 are provided (see Fig. 1) on the side of the aircraft fuselage 7 adjacent the cockpit 8.

The lever 35 controls through a Bowden wire connection 37 the usual release device 38 for the actual launching of the apparatus, whereas the lever 36 is employed for effecting, through a similar connection 39, the hand release of the main parachute when launching the load lowering apparatus from low altitudes.

For this latter purpose, referring to Fig. 2, one end of a cord 40 of suitable length is connected through a slip coupling 41, 42 with the extension 32 on the catch lever 27, the other end of said cord 40 being provided with a head or enlargement 43 by which it can either be temporarily held by a spring catch 44 in a tube 45 secured on the launching cradle 14 or positively retained in the tube by a bolt 46 adapted to be projected into the bore of the tube against the action of a spring 47 by the operation of a hand lever 36 hereinbefore mentioned.

A further head or enlargement 48 secured on a branch cord 49 connected to the cord 40 is adapted to be received in a tube 50 arranged in the frame 10, within which tube the slip coupling 41, 42 is also received. This head 48 is retained in the tube 50 by a spring catch 51 which is stronger than the catch 44 arranged on the tube 45 and the slack of the cord 40 is disposed in a pocket 52 in the frame 10, as shown.

The slip coupling 41, 42 comprises interengaging bean-shaped members the lower of which, 42, is connected by a pin and slot connection 53 with the free end of the extension 32 of the catch lever 27, said end of the extension working in a slot 54 in the tube 50.

In the event of the cord 40 being held by the engagement of the head 43 thereon with the bolt 46 due to the operation of lever 36, it will be seen that release of the load from the cradle 14 by the operation of lever 35 will cause the head 48 to be snapped past the spring catch 51 in the tube 50 and that, after the slack of the cork 40 has been taken up by the fall of the load, the coupling 41, 42 will also be snapped past the said catch 51, operating the catch lever 27 to release the coupling 23, 24 during its movement. The main parachute is thus pulled out by the pilot parachute as the load lowering apparatus falls away from the air craft. The pilot weight not being required to operate in such cases is not coupled to the load lowering apparatus. It will be understood that the members 41 and 42 of the slip coupling will disengage immediately they are withdrawn from the tube 50.

Furthermore, as a safeguard for ensuring that the coupling jaws remain open, there is provided a pawl 55 pivoted in the frame 10, urged towards the catch lever 27 by a spring 56, the pawl being at a suitable position for ensuring that, when the catch lever is displaced to the release position, the pawl 55 will engage a nose 57 on the said lever to hold same in the said position.

Referring now to Figs. 3 and 4, the pilot weight 3 is equipped with electric circuit closing mechanism and comprises a central weight 58 enclosed in an co-operating with resilient displaceable members 59 and deformable members 60 mounted on but spaced from the weight 58 and from each other. The inner members 59 consist of contact strips normally spaced radially from the weight 58 and formed of resilient metal whilst the outer members consist of contact strips of soft metal normally spaced radially from the inner strips 59 and adapted to be deformed easily on impact with the ground or other object, the resiliency of the inner contact strips 59 maintaining the contact made by the deformation of the outer strips 60 against them.

The two sets of contact strips 59, 60 are insulated from each other, as by insulating bushes 66, and the outer strips 60 are electrically connected, as at 61, to an electric conductor 62 extending through the cable 2 to the plug 63 in the coupling member 11, whilst the inner contact strips 59 are electrically connected to a similar conductor 65, also extending through the cable 2, and connected with the socket 64 in said coupling member 11.

The coupling member 11 is adapted to be engaged with the coupling member 12 with its plug 63 and socket 64 co-operating with the socket 67 and plug 68 of the latter, a mechanical coupling being also provided and comprising, for example, a spring tongue 69 on the coupling member 12 adapted to engage by its aperture 70 over a pin 71 on the coupling member 11.

From the plug 68 and socket 67 of the coupling member 12 there extend two electric conductors 72 and 73 respectively, passing through the cable 9 and connecting to the remainder of the electrical circuit within the load lowering apparatus as indicated diagrammatically in Fig. 4.

The lead 73 is connected to one terminal of an electric accumulator 74 or other source of electric current, in the parachute apparatus, and the lead 72 is connected to a terminal 75 on an insulating base 76 secured in the frame 10 of the apparatus (see Fig. 2).

From said terminal a wire 77 leads to each of the cartridges 33 and the return leads 78 from said cartridges are connected to a common terminal 79 on the base 76 from which a connection 80 leads to one spring contact 81 of a jack 82 (Fig. 4) the other spring contact 83 of which is connected to the other terminal of the accumulator 74 by a conductor 84.

During the time the load lowering apparatus 10 is supported from the cradle 14, a plug 85 of insulating material is disposed between the springs 81 and 83 of the jack 82, which is secured on the said apparatus 10, this plug being connected by a cord 86 to the cradle 14 so that the falling of the load away from said cradle on launching will withdraw the plug 85 and allow the spring contacts 81 and 83 to press together. As will be understood this precludes any premature ignition of the cartridges 33 and renders the apparatus more reliable.

As will be seen from Fig. 2, the cable 9 is protected from abrasion at the point where it enters the frame 10 by a padding or binding 87 and, as shown in Fig. 1, it is similarly protected at 88 where it passes through an eye 89 secured on the aircraft for guiding the cables 2 and 9.

The operation of the apparatus hereinbefore described will be readily understood from the following:—

When launching the load lowering apparatus from a high altitude the weight 3 is allowed to fall to unwind the cable 2 from the drum 1, which may in some cases be held in the hands during this operation. The coupling member 11 is disengaged from the drum and engaged with the coupling member 12 on the cable 9, which cable has previously been disengaged from a spring clip 90 (Fig. 1) on the side of the aircraft fuselage 7 and held by a cord (not shown) secured to a loop 91 attached to the cable, this cord being paid out slowly, when the coupling of the members 11, 12 has been effected, to allow the weight to draw the cable 9 out through the eye 89, whereupon the lever 35 is actuated to release the load 13 from the cradle 14 in the usual manner.

As the spring catch 51 is stronger than the spring catch 44 (Fig. 2) and the bolt 46 is inoperative, the fall of the load 13 causes the head 43 on the cord 40 to snap out of the tube 45. After a short distance has been traversed by the load the jack plug 85 is first withdrawn by the cord 86 and, the slack in the line 20 being then taken up, the pilot parachute 18 is withdrawn from its container and opens out.

The disposition of the parts is then as follows:—The pilot parachute 18 is extended and connected by its line 20 to the loop on the lines 21, 22 engaged in the jaws 23, 24 of the frame 10, this frame with its associated load 13 being disposed with its longer axis vertical and having attached to its lower end a length of cable (9, 2) supporting the weight 3.

Owing to the fact that the pilot parachute is not sufficiently large to retard the fall of the load etc. to any appreciable extent, the whole apparatus descends rapidly towards the ground until the weight 3 strikes the latter or an object thereon, such as a tree for example.

Immediately this takes place the electric circuit through the cartridges 33 and accumulator 74 is completed at the contacts 59, 60 whereupon the cartridges are exploded to impel the projectiles 31 against the extension 32 of the catch lever 27 which is thereby displaced against the action of the spring 29 to release the lever 25 and is retained in the release position by the pawl 55.

The opening of the jaws 23, 24 releases the loop on the lines 21, 22 which are thereupon pulled upwardly by the pilot parachute 18 to break the cord 17 and withdraw the pin 16 and to withdraw the main parachute from its container 15 respectively.

The further descent of the load 13 is then effected under the restraint of the main parachute which brings it gently to earth.

Suppose now that a load is to be launched from a low altitude.

In this case the weight 3 and the electrical release of the main parachute are not required, so first the hand lever 36 is operated to project the bolt 46 into the bore of the tube 45, the end of the cable 9 is released from the clip 90 and then the hand lever 35 is operated to release the load.

The first part of the fall of the load draws the head 48 and clip coupling 41, 42 on the cord 40 out of the tube 50, actuating the lever 25 meanwhile to the open position. The coupling 41, 42 disengages outside the tube and at about the same time the pilot parachute 18, which is now open, draws the main parachute out of its container 15 as already described.

Here, it will be noted, the load descends for the major and latter portion of its fall under the restraint of the main parachute.

The load lowering apparatus indicated at 10 (Fig. 1) is of small thickness and is adapted to be disposed between two mail bags 13 or other packages and leave a space beneath it at the forward end between the packages for the accommodation of the main parachute in its container 15. As will be understood, to prevent undue strain on the cable 2, 9, a small braking parachute may be attached to the weight 3 to retard the forward motion thereof.

Various modifications may obviously be made in the construction and details of the apparatus described without departing from the scope of the appended claims.

I claim:

1. Apparatus for lowering mail bags and other loads from aircraft, comprising a cradle suspended beneath the aircraft and releasably supporting the load to be lowered, a pilot parachute adapted to become operative upon the release of the load from the cradle, said pilot parachute having a connection to a main parachute housed in a container in the said load but being prevented from acting to withdraw the said main parachute from its container by coupling means engaged with said connection and mounted in load-lowering apparatus built into the load, and means in said load-lowering apparatus for disengaging said coupling means after the partial descent of the load in order to allow the pilot parachute to withdraw the main parachute from its container, said main parachute then becoming operative in retarding the further descent of the load.

2. Apparatus according to claim 1, including a pilot weight attached to one end of a cable comprising two insulated conductors connected respectively to separate sets of contacts in the said weight, said cable being wound upon a drum secured on the aircraft and being adapted to be unwound prior to the release of the load, means for mechanically and electrically connecting the other end of the unwound cable to electrically operated means for disengaging the coupling means in the load-lowering apparatus, and means actuated from the aircraft for releasing the load, so that after the load has reached a given distance from the ground, determined by the length of the cable aforesaid, the contacts in the weight are brought together to complete an electric circuit through the electrically operated means, whereby the main parachute is released.

3. An apparatus according to claim 1, forming the coupling means as a pair of opposed jaws, one jaw being fixed and the other jaw being formed on a pivoted lever, and holding the coupling in the engaged position by means of a catch lever engaging the said pivoted lever, means being provided for automatically disengaging said catch lever from the pivoted lever in order to allow the latter to move to the disengaged position when the main parachute is to be released.

4. Apparatus for lowering mail bags and other loads from aircraft comprising a launching cradle suspended beneath the aircraft, a load supported from said cradle, a load-lowering apparatus embodied in the load and including a main parachute, a pilot parachute and a container for said main parachute, a container for the pilot parachute secured on the launching cradle, a connection from the said pilot parachute to the main parachute, releasable coupling means in the load-lowering apparatus engaging said connection and preventing same from acting to withdraw the main parachute from its container, means controlled from the aircraft for releasing the load from the launching cradle, upon the operation of which means the load falls from the cradle and pulls the pilot parachute from its container to allow same to become operative, and means adapted to operate after the load has fallen for some distance to release the coupling means in the load-lowering apparatus in order to allow the pilot parachute to withdraw the main parachute from its container, whereupon the said main parachute becomes operative in retarding the further descent of the load.

5. Apparatus of the character described, including a load suspended from an aircraft, means for releasing said load, a pilot parachute and a main parachute adapted to control the rate of descent of the load, coupling means for keeping the main parachute inoperative until the load reaches a given distance from the ground, electrically operated means for releasing said coupling means, an electric circuit comprising said electrically operated means, a source of current, electric conductors extending through a cable to which a pilot weight is attached, and circuit closing means in said pilot weight, a rotary drum mounted on the aircraft and having the said cable wound thereon, means for unwinding said cable and means for electrically and mechanically coupling the unwound cable to the electrically operated means so that when the pilot weight strikes the ground the electric circuit through the electrically operated means is completed and said means cause the release of the coupling means to allow the main parachute to become operative in retarding the further descent of the load.

In testimony whereof he has affixed his signature.

HAROLD EDWARD SHERWIN HOLT.